(12) United States Patent
Tamura et al.

(10) Patent No.: US 12,125,284 B2
(45) Date of Patent: Oct. 22, 2024

(54) OBJECT SEARCH DEVICE AND OBJECT SEARCH METHOD

(71) Applicant: Hitachi, Ltd., Tokyo (JP)

(72) Inventors: Masato Tamura, Tokyo (JP); Tomoaki Yoshinaga, Tokyo (JP); Atsushi Hiroike, Tokyo (JP); Hiromu Nakamae, Tokyo (JP); Yuta Yanashima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 382 days.

(21) Appl. No.: 17/784,472

(22) PCT Filed: Oct. 13, 2020

(86) PCT No.: PCT/JP2020/038659
§ 371 (c)(1),
(2) Date: Jun. 10, 2022

(87) PCT Pub. No.: WO2021/131248
PCT Pub. Date: Jul. 1, 2021

(65) Prior Publication Data
US 2023/0005268 A1    Jan. 5, 2023

(30) Foreign Application Priority Data

Dec. 24, 2019 (JP) .................. 2019-232512

(51) Int. Cl.
G06V 20/52 (2022.01)
G06V 10/82 (2022.01)
G06V 20/64 (2022.01)

(52) U.S. Cl.
CPC .............. G06V 20/52 (2022.01); G06V 10/82 (2022.01); G06V 20/647 (2022.01); G06V 2201/07 (2022.01)

(58) Field of Classification Search
CPC ...... G06V 20/52; G06V 10/454; G06V 10/62; G06V 10/82; G06V 20/647;
(Continued)

(56) References Cited

U.S. PATENT DOCUMENTS

2017/0300737 A1\* 10/2017 Wang ..................... G06V 20/13
2022/0165048 A1\* 5/2022 Ham ......................... G06T 7/97

FOREIGN PATENT DOCUMENTS

| JP | 2009-027393 A | 2/2009 |
| JP | 2015-176484 A | 10/2015 |
| WO | WO-2018/179338 A1 | 10/2018 |

OTHER PUBLICATIONS

International Search Report with English translation and Written Opinion in International Application No. PCT/JP2020/038659 mailed Dec. 1, 2020.

\* cited by examiner

*Primary Examiner* — Ian L Lemieux
(74) *Attorney, Agent, or Firm* — Foley & Lardner LLP

(57) ABSTRACT

An object of the invention is to configure an object search device capable of expressing information on shapes and irregularities as features only by images, in a search for an object that is characteristic in shape or irregularity, and performing an accurate search.

The object search device includes: an image feature extraction unit that is configured with a first neural network, and is configured to input an image to extract an image feature; a three-dimensional data feature extraction unit that is configured with a second neural network, and is configured to input three-dimensional data to extract a three-dimensional data feature; a learning unit that is configured to extract an image feature and a three-dimensional data feature from an image and three-dimensional data of an object obtained from a same individual, respectively, and update an (Continued)

image feature extraction parameter so as to reduce a difference between the image feature and the three-dimensional data feature; and a search unit that is configured to extract image features of a query image and a gallery image of the object by the image feature extraction unit using the updated image feature extraction parameter, and calculate a similarity between the image features of both images to search for the object.

11 Claims, 11 Drawing Sheets

(58) Field of Classification Search
CPC .... G06V 2201/07; G06V 10/40; G06V 20/20; G06V 20/64; G06V 40/10; G06F 16/00; G06N 3/08; G06T 1/00; G06T 2207/20084; G06T 2207/30196; G06T 2207/30232; G06T 2207/30241; G06T 7/00; G06T 7/20; G06T 2200/04; G06T 7/70

See application file for complete search history.

[FIG. 1]
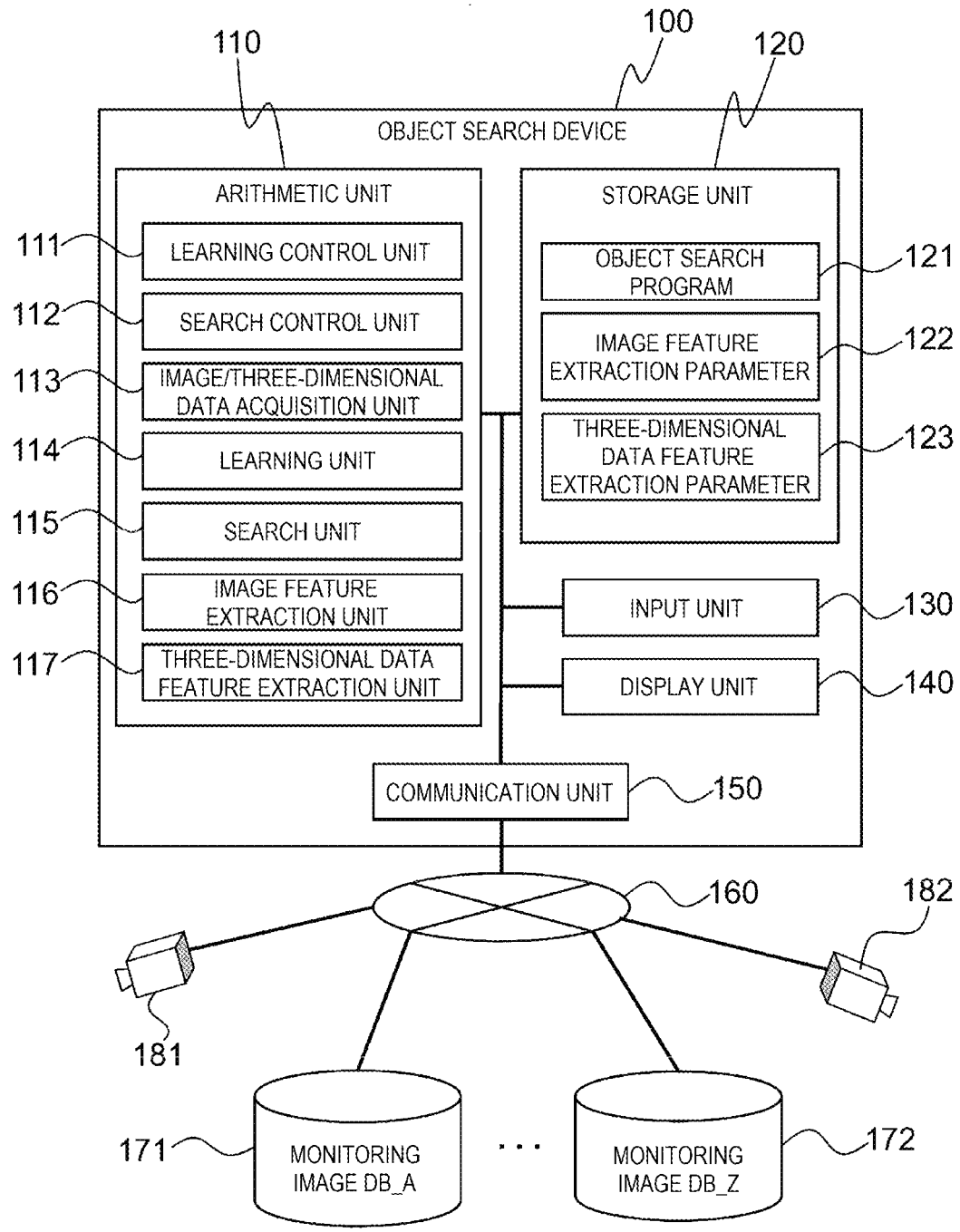

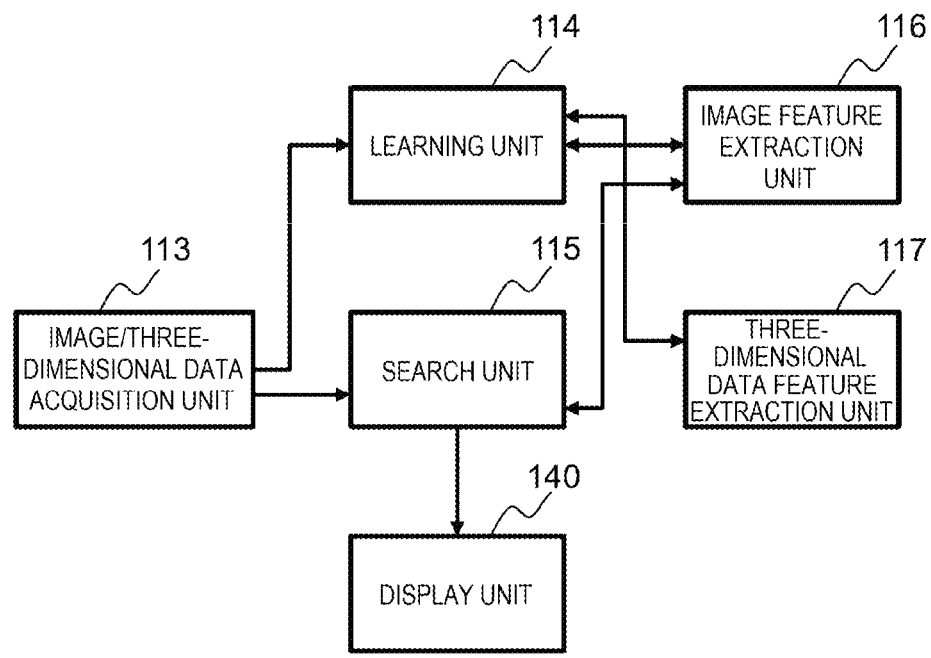
[FIG. 2]

[FIG. 3]
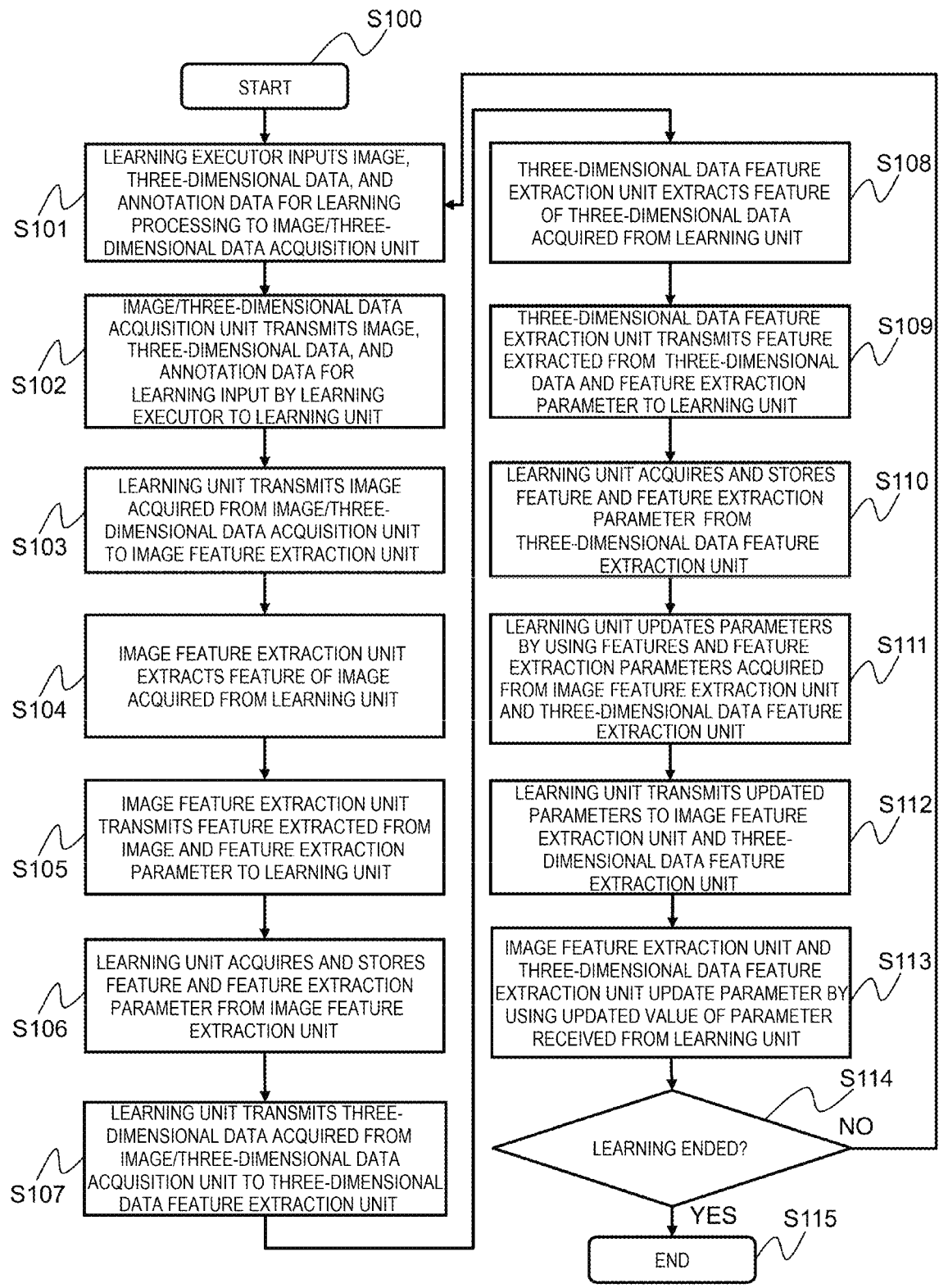

[FIG. 4]
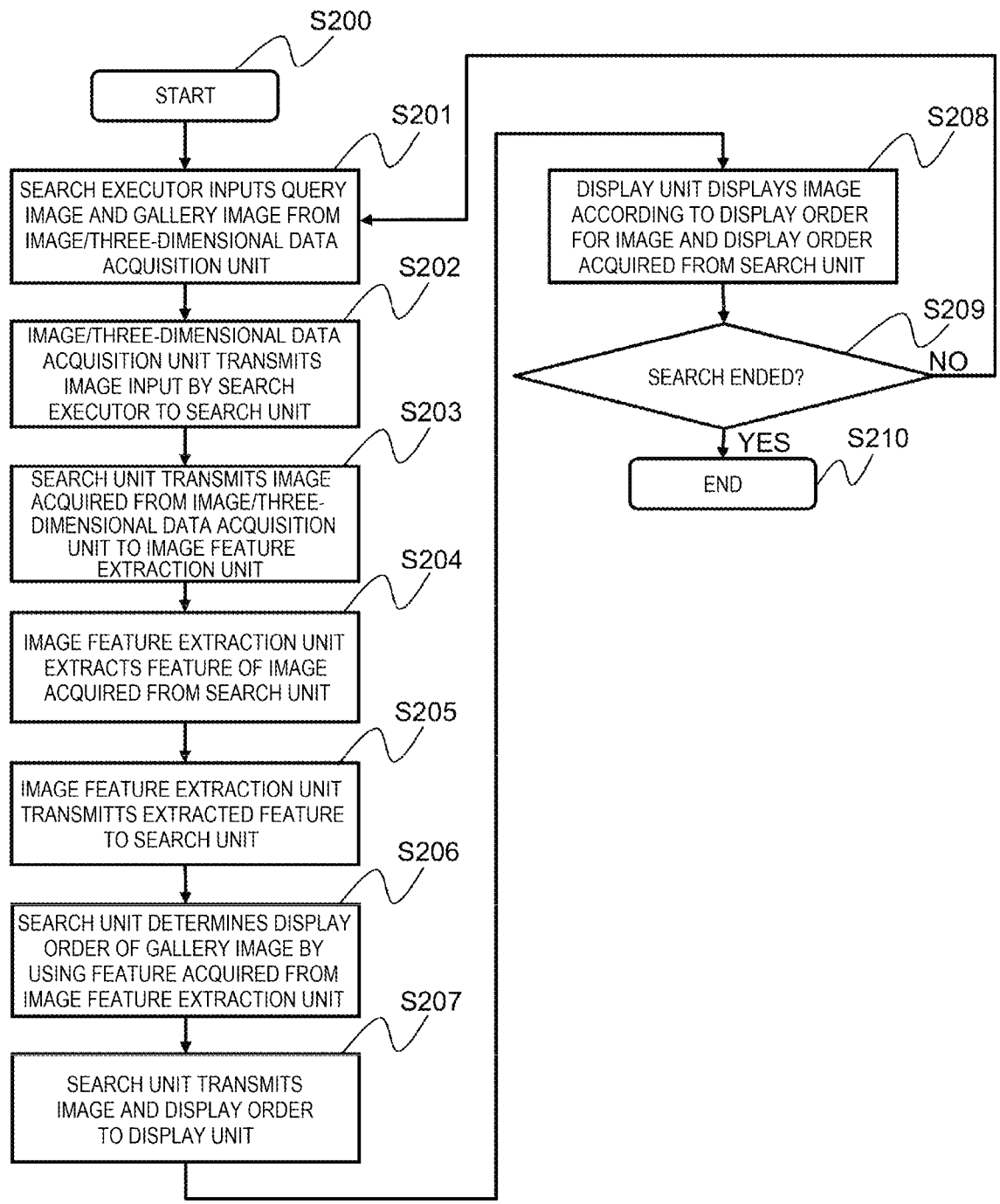

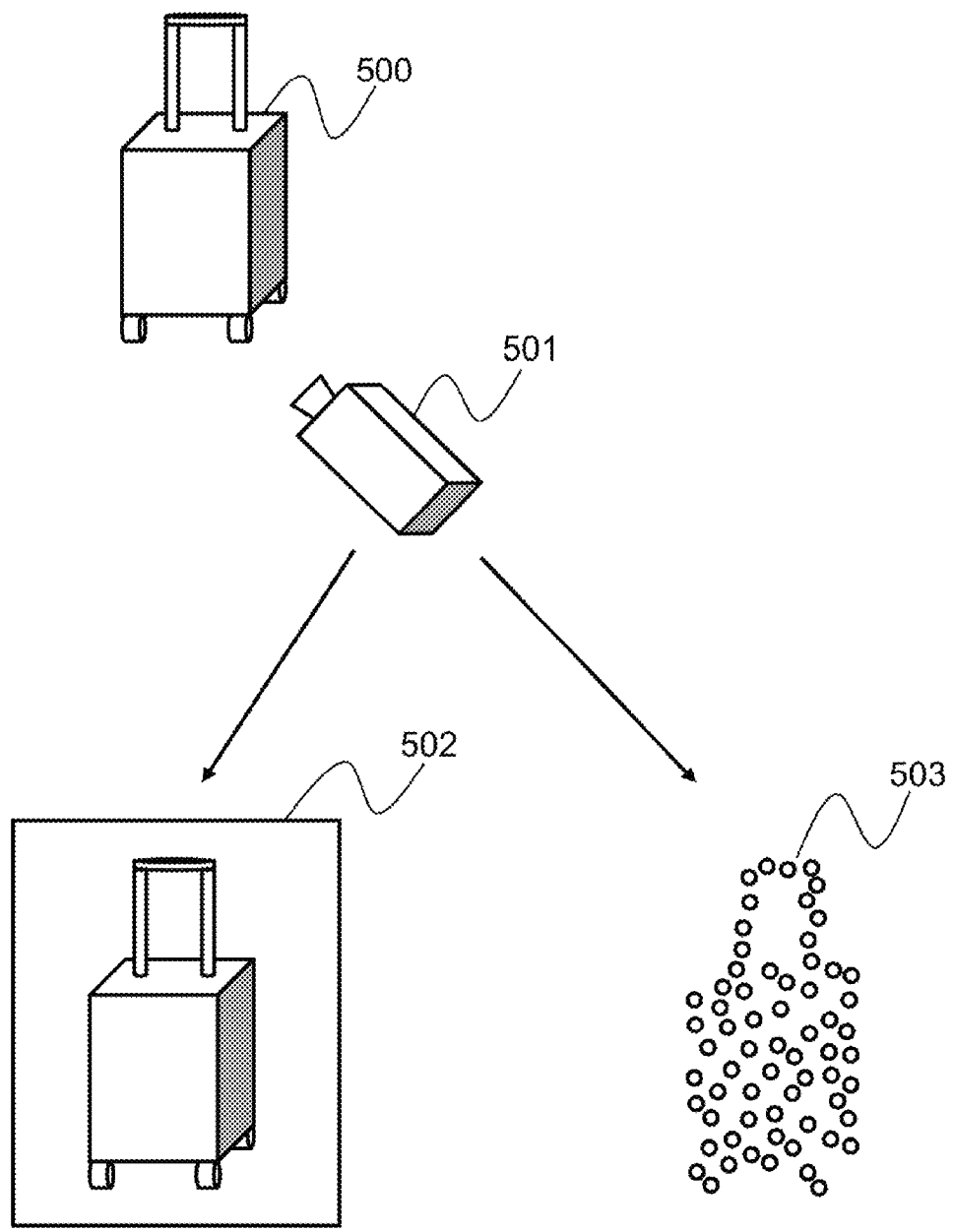
[FIG. 5]

[FIG. 6]
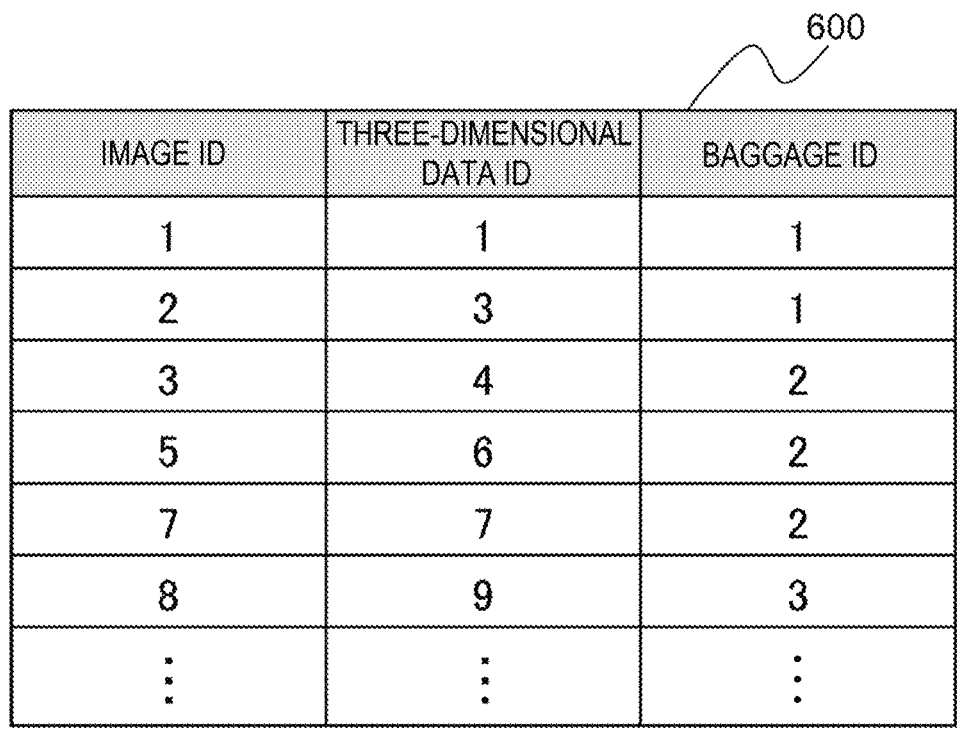

[FIG. 7]
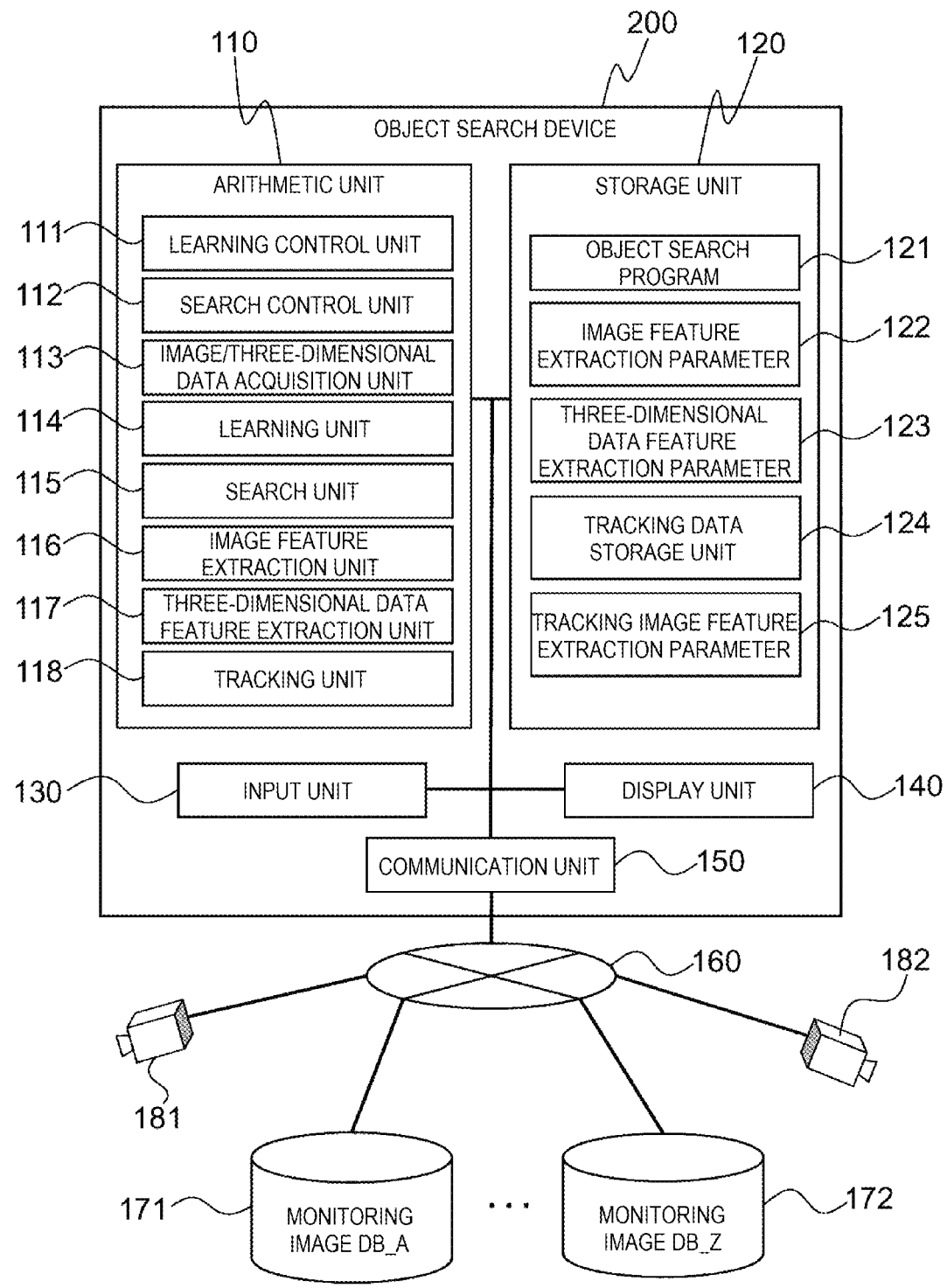

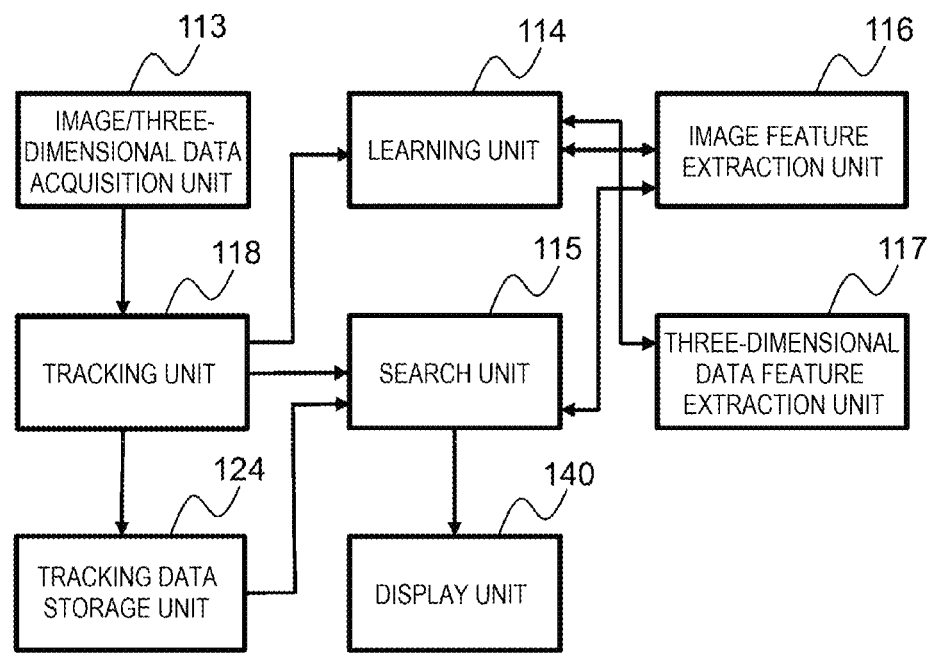
[FIG. 8]

[FIG. 9]
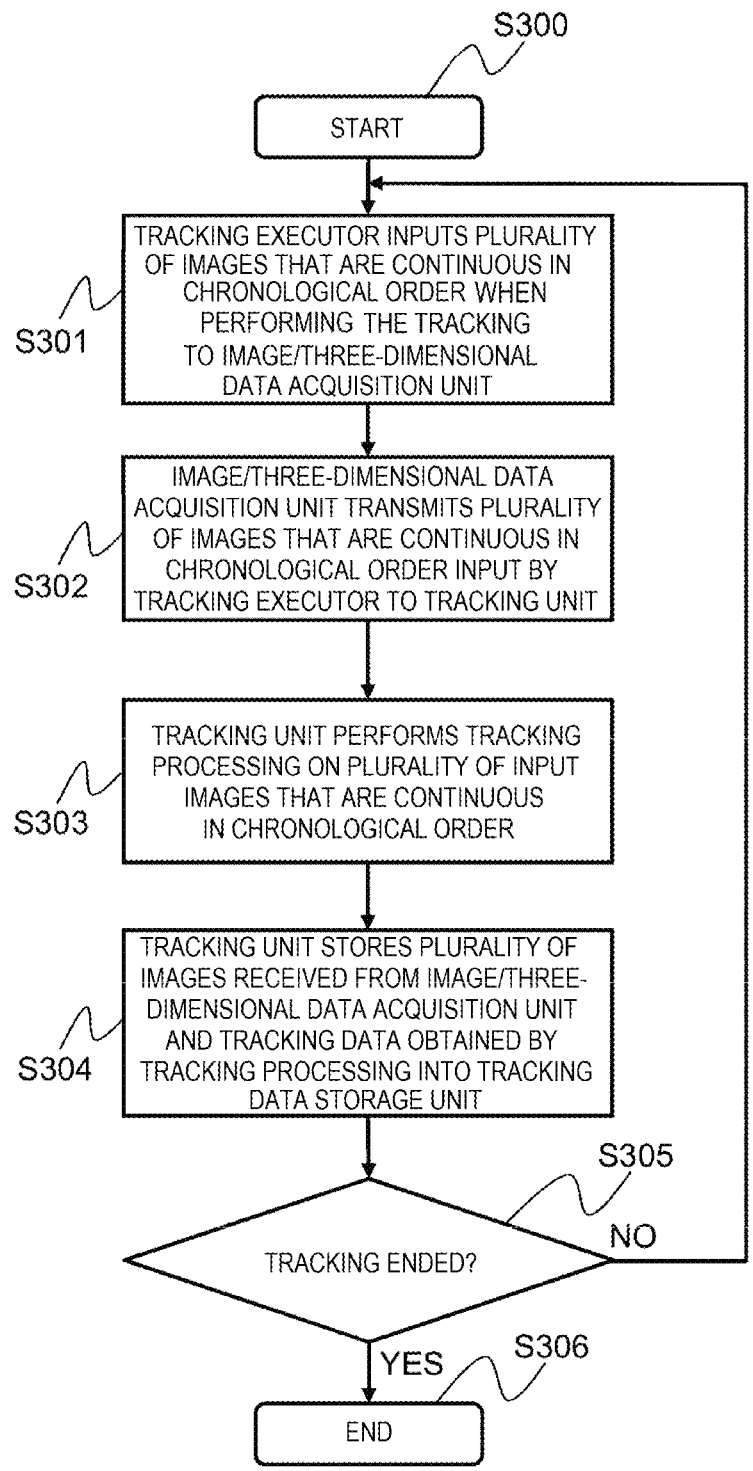

[FIG. 10]
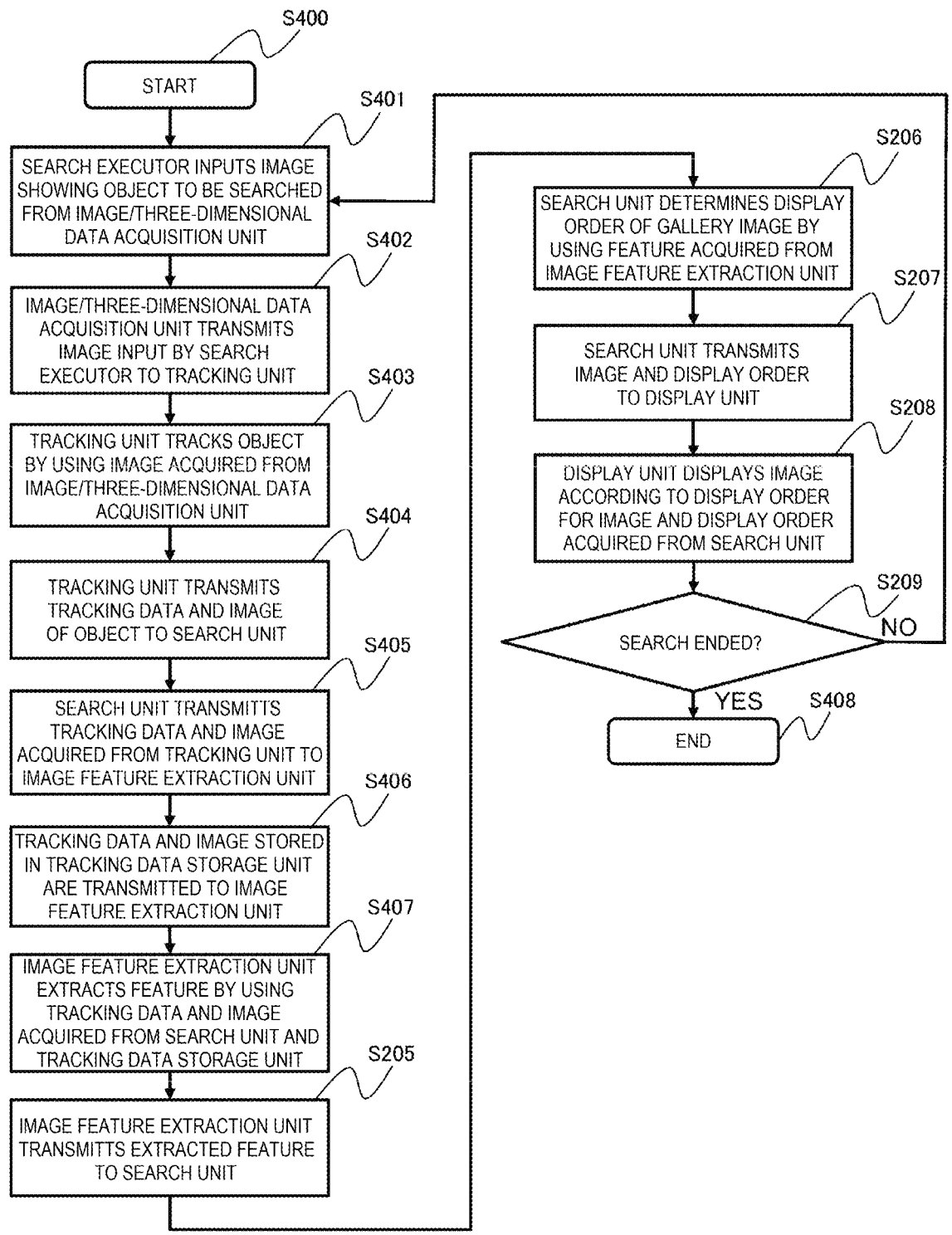

[FIG. 11]
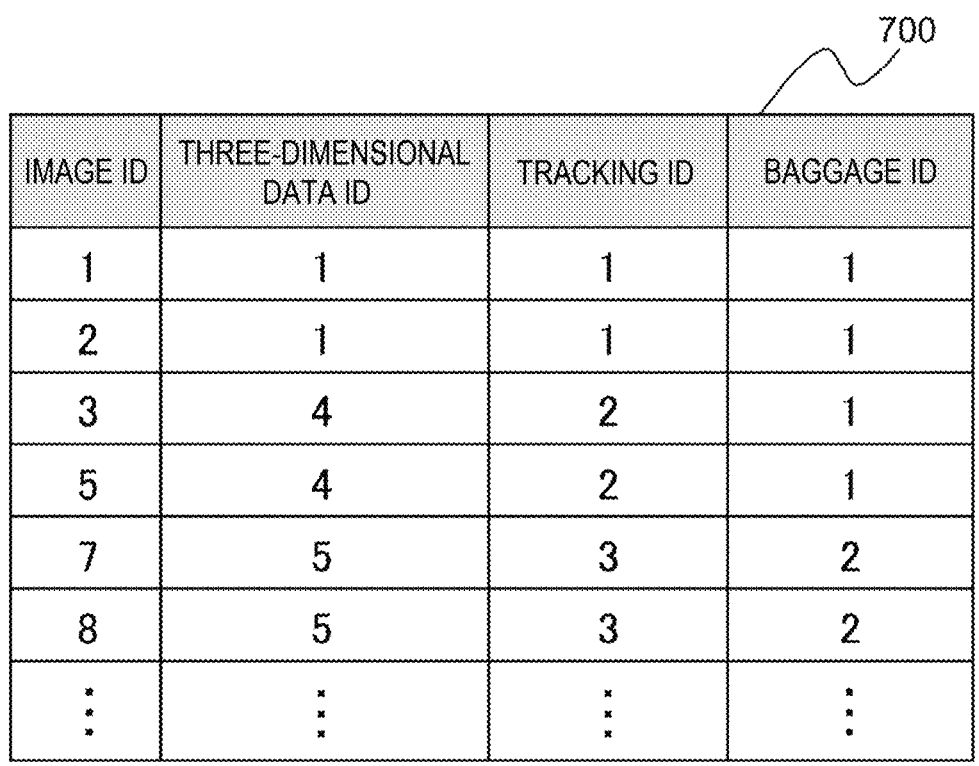

OBJECT SEARCH DEVICE AND OBJECT SEARCH METHOD

TECHNICAL FIELD

The present invention relates to an object search device and an object search method.

BACKGROUND ART

There are monitoring systems as applications for searching for similar objects. For example, when a target to be searched is a person, a person search can be used to assist a surveillant in tracking a suspicious person. For example, when the target to be searched is an item of baggage, a baggage search can be used to track an item of left-behind baggage or suspicious baggage from the baggage shown in an image of a camera at another place, and identify the owner. In such an application, it is preferable that a same individual such as the same person or the same baggage appears at a higher rank of a search result, and a highly accurate search is required.

PTL 1 discloses a background art of this technical field. This related art discloses that: "A video monitoring system includes a video acquisition unit that acquires signals from imaging devices such as one or more cameras, and an image data unit that holds an input image acquired by the video acquisition unit. The image monitoring system further includes a condition designating unit that designates a personal characteristic, time, and a camera from the input image, an image search unit that searches for, by image recognition, an image matching conditions designated by the condition designating unit from an input image group stored in the image data unit, and a result displaying unit that displays results of the image search unit. A means is provided for selecting, by user designation or a person tracking method, a plurality of personal characteristics designated by the condition designating unit and for adding such personal characteristics to search conditions of the condition designating unit".

CITATION LIST

Patent Literature

PTL 1: JP-A-2009-27393
PTL 2: JP-A-2015-176484

SUMMARY OF INVENTION

Technical Problem

As a method for performing a highly accurate search as required by a monitoring system, there are methods disclosed in PTL 1 and PTL 2. PTL 1 has proposed a search method using an image. In recent years, a method of inputting images into a convolutional neural network (CNN) to extract feature, and calculating a similarity of the feature is often used. In this method, for a same individual, various images are prepared in which lighting environments or positions and sizes of objects are different, and the CNN is subjected to learning to extract similar features for those images. With the learning, the CNN is robust to various image changes and is able to perform highly accurate searches. PTL 2 has proposed a search method using a three-dimensional model. In the search using a three-dimensional model, for images including depth information and point cloud data, features are extracted by using classical feature extraction such as a local binary pattern (LBP) or a neural network (NN), and a similarity of the features is calculated in the same manner as for images. By using the three-dimensional model, it is possible to extract features of shapes and irregularities for which extraction of the features from images thereof is difficult, and it is possible to improve the accuracy of the search.

The search using images disclosed in PTL 1 and the search using three-dimensional data disclosed in PTL 2 are useful, but there are still problems. In the search using images, since the images do not include information on three-dimensional shapes and irregularities of objects, it is not possible to perform a search including the information. Thus, for example, when there are a plurality of items of baggage having similar colors to a target to be searched but having different irregularity patterns from the target to be searched, there is a high possibility that an erroneous search result will be obtained in the search using images. The search using three-dimensional data requires accurate three-dimensional information in order to perform the highly accurate search. Depth cameras are limited in a distance at which accurate three-dimensional data of an imaging target can be acquired, and a large number of depth cameras are required depending on a monitoring range. This causes a problem of installation cost of the depth cameras. In addition, since a data amount to be processed of the three-dimensional data is larger than a data amount to be processed of images, feature extraction for three-dimensional data takes much time.

To solve such a problem, the invention proposes a method of estimating, from images, features including information on shapes and irregularities obtained from three-dimensional data and performing feature extraction. With the invention, an object is to configure an object search device capable of expressing information on shapes and irregularities as features only by images, in a search for an object that is characteristic in shape or irregularity, and performing an accurate search.

Solution to Problem

A preferred example of an object search device of the invention includes: an image feature extraction unit that is configured with a first neural network and is configured to input an image to extract an image feature; a three-dimensional data feature extraction unit that is configured with a second neural network and is configured to input three-dimensional data to extract a three-dimensional data feature; a learning unit that is configured to extract an image feature and a three-dimensional data feature from an image and three-dimensional data of an object that are obtained from a same individual, respectively, and update an image feature extraction parameter so as to reduce a difference between the image feature and the three-dimensional data feature; and a search unit that is configured to extract image features of a query image and a gallery image of the object by the image feature extraction unit using the updated image feature extraction parameter, and calculate a similarity between the image features of both images to search for the object.

As another characteristic of the invention, the object search device further includes: a tracking unit that is configured with a third neural network, and is configured to input a plurality of images that are continuous in chronological order, and connect objects of a same type as objects, which are spatially close to each other in distance, based on detection results of the images, so as to generate, as tracking data, a plurality of images of a same individual that are continuous in chronological order; and a tracking data storage unit that is configured to store the tracking data generated by the tracking unit, in which the search unit is configured to perform object search by using the tracking data, which is obtained from the tracking unit and the tracking data storage unit, and the images.

A preferred example of an object search method of the invention includes: performing learning processing of inputting an image and three-dimensional data of an object that are obtained from a same individual, extracting an image feature from the image by a first neural network, extracting a three-dimensional data feature from the three-dimensional data by a second neural network, and updating an image feature extraction parameter so as to reduce a difference between the image feature and the three-dimensional data feature; and extracting image features of a query image and a gallery image of the object by the first neural network of an image feature extraction unit using the updated image feature extraction parameter, and calculating a similarity between the image features of both images to search for the object.

As another characteristic of the invention, in the object search method, the image feature extraction parameter is a weight and a bias of each neuron constituting the first neural network.

Advantageous Effect

According to the invention, it is possible to provide a highly accurate object search device that expresses three-dimensional information such as shapes and irregularities as a feature only based on an image. It is not necessary to handle three-dimensional data at the time of a search, and an effect is obtained that the problem of a higher installation cost of depth cameras and the problem of much processing time of the feature extraction do not occur. Other effects will be described in each embodiment.

BRIEF DESCRIPTION OF DRAWINGS

FIG. 1 is a configuration diagram of an object search device according to a first embodiment.

FIG. 2 is a functional block diagram of functional units controlled by a learning control unit or a search control unit of the object search device.

FIG. 3 is a flowchart of an example of learning processing in the first embodiment.

FIG. 4 is a flowchart of an example of search processing in the first embodiment.

FIG. 5 is a diagram showing an example of an image and three-dimensional data required for the learning processing used in the present embodiment.

FIG. 6 is a table showing annotation data required for the learning processing used in the first embodiment.

FIG. 7 is a configuration diagram of an object search device according to a second embodiment.

FIG. 8 is a functional block diagram of functional units controlled by a learning control unit or a search control unit of the object search device of the second embodiment.

FIG. 9 is a flowchart of an example of tracking processing used in the second embodiment.

FIG. 10 is a flowchart of an example of search processing used in the second embodiment.

FIG. 11 is a table showing annotation data required for the learning processing used in the second embodiment.

DESCRIPTION OF EMBODIMENTS

Hereinafter, embodiments of the invention will be described with reference to the drawings.

First Embodiment

In the present embodiment, an example in which an object search device serving as an example searches for baggage such as a suitcase will be described. A target to be searched does not have to be the baggage, and may be any object that can be imaged.

FIG. 1 is a configuration diagram of the object search device according to the present embodiment.

An object search device 100 can be configured on a general-purpose computer, and a hardware configuration thereof includes: an arithmetic unit 110 including a central processing unit (CPU), a random access memory (RAM), etc.; a storage unit 120 including a read only memory (ROM), a hard disk drive (HDD), a solid state drive (SSD) using a flash memory or the like, etc.; an input unit 130 including an input device such as a keyboard or mouse; a display unit 140 including a display device such as a liquid crystal display (LCD) or organic EL display; a communication unit 150 including a network interface card (NIC) or the like; and the like.

The communication unit 150 is connected, via a network 160, to a monitoring image database_A171, a monitoring image database_Z172, and cameras 181 and 182 installed in various places, which are shared with an external monitoring system.

The arithmetic unit 110 implements the following functional units by loading an object search program 121 stored in the storage unit 120 into the RAM and executing the object search program 121 by the CPU. The arithmetic unit 110 includes a learning control unit 111, a search control unit 112, an image/three-dimensional data acquisition unit 113, a learning unit 114, a search unit 115, an image feature extraction unit 116, and a three-dimensional data feature extraction unit 117.

The learning control unit 111 is activated by an instruction of a learning executor (a human or a computer that controls learning), and controls each of the following functional units in order to execute learning processing requested by the learning executor.

The search control unit 112 is activated by an instruction of a search executor (a human or a computer that performs a search), and controls the following functional units in order to execute search processing requested by the search executor.

FIG. 2 shows a functional block diagram of the functional units controlled by the learning control unit 111 or the search control unit 112.

The image/three-dimensional data acquisition unit 113 processes input and output of data when executing the learning processing or the search processing. When executing the learning processing, the image/three-dimensional data acquisition unit 113 accepts images, three-dimensional data, and annotation data used for the learning processing from the learning executor, or receives images and three-dimensional data requested by the learning executor from the outside, and transmits these types of data to the learning unit 114. Here, the annotation data is correct answer data for performing learning.

When executing the search processing, the image/three-dimensional data acquisition unit 113 accepts a query image and a gallery image from the search executor, or alternatively acquires both or either of a query image and a gallery image requested by the search executor from the outside, and transmits those images to the search unit 115. Here, the query image is an image showing the baggage to be searched, and the gallery image is an image that is to be compared with based on the query image to search for an image that shows the same individual baggage as the baggage to be searched.

The learning unit 114 updates, by learning, parameters (weights and biases of neurons constituting a neural network) used when the image feature extraction unit 116 and the three-dimensional data feature extraction unit 117 extract features. At the time of executing the learning, the learning unit 114 receives images, three-dimensional data, and annotation data used for the learning from the image/three-dimensional data acquisition unit 113. The learning unit 114 transmits the received image to the image feature extraction unit 116, and receives a feature extracted by the image feature extraction unit 116. The learning unit 114 transmits the received three-dimensional data to the three-dimensional data feature extraction unit 117, and receives a feature extracted by the three-dimensional data feature extraction unit 117. The learning unit 114 receives the parameters for feature extraction from the image feature extraction unit 116 and the three-dimensional data feature extraction unit 117, and transmits the updated parameters to the image feature extraction unit 116 and the three-dimensional data feature extraction unit 117.

The search unit 115 performs input and output processing, calculation, and display management for a search. At the time of executing the search, the search unit 115 receives a query image and a gallery image used for the search from the image/three-dimensional data acquisition unit 113, and transmits these images to the image feature extraction unit 116. The search unit 115 receives a feature from the image feature extraction unit 116, and transmits a search result calculated based on the feature to the display unit 140.

The display unit 140 displays the search result. At the time of executing the search, the display unit 140 acquires the query image, the gallery image, and a display order from the search unit 115, and displays the images according to the display order.

The image feature extraction unit 116 extracts features required for similarity calculation from images. At the time of executing the learning, the image feature extraction unit 116 receives the images from the learning unit 114, and transmits the extracted features to the learning unit 114. In addition, the image feature extraction unit 116 transmits the parameters for feature extraction to the learning unit 114, and receives the updated parameters from the learning unit 114. At the time of executing the search, the image feature extraction unit 116 receives the images from the search unit 115, and transmits the extracted feature to the search unit 115.

The three-dimensional data feature extraction unit 117 extracts features required for the similarity calculation from three-dimensional data. At the time of executing the learning, the three-dimensional data feature extraction unit 117 receives the three-dimensional data from the learning unit 114, and transmits the extracted features to the learning unit 114. The three-dimensional data feature extraction unit 117 transmits the parameters for feature extraction to the learning unit 114, and receives the updated feature from the learning unit 114.

An image feature extraction parameter 122 of the storage unit 120 stores parameters (weights and biases of neurons constituting the neural network) used when the image feature extraction unit 116 extracts an image feature.

A three-dimensional data feature extraction parameter 123 of the storage unit 120 stores parameters (weights and biases of neurons constituting the neural network) used when the three-dimensional data feature extraction unit 117 extracts a three-dimensional data feature.

FIG. 3 shows a flowchart of an example of the learning processing used in the present embodiment.

In step S100, the learning control unit 111 is activated by a learning start operation of the learning executor to start the learning processing.

In step S101, the learning executor inputs images, three-dimensional data, and annotation data required for the learning into the image/three-dimensional data acquisition unit. Here, when the images include color information, three-dimensional data including color information is used.

In step S102, the image/three-dimensional data acquisition unit transmits the images, the three-dimensional data, and the annotation data received in step S101 to the learning unit 114.

In step S103, the learning unit transmits the images received in step S102 to the image feature extraction unit 116.

In step S104, the image feature extraction unit 116 performs feature extraction on the images received in step S103. For example, a CNN is used for the feature extraction. The CNN accepts the images as an input, converts the images into numerical vectors as features, and outputs the features. This conversion is performed by repeating a convolution operation by using a parameter held by the CNN (using the image feature extraction parameter 122). The parameter can be initially set to any value, and the value of the parameter is updated by learning.

In step S105, the image feature extraction unit transmits the features extracted in step S104 and the parameter used for the feature extraction (image feature extraction parameter 122) to the learning unit 114.

In step S106, the learning unit 114 stores the image features received in step S105 and the image feature extraction parameter.

In step S107, the learning unit transmits the three-dimensional data received in step S102 to the three-dimensional data feature extraction unit 117.

In step S108, the three-dimensional data feature extraction unit 117 performs the feature extraction on the three-dimensional data received in step S107. For the feature extraction, for example, a neural network (NN) for three-dimensional data is used. For example, a point net or the like is used. The NN for three-dimensional data accepts the three-dimensional data as an input, converts the three-dimensional data into numerical vectors as features, and outputs the features. This conversion is performed by repeating processing of: using a parameter held by the NN for three-dimensional data (using the three-dimensional data feature extraction parameter 123) to linearly convert the three-dimensional data and inputting the converted three-dimensional data to a nonlinear function. The parameter can be initially set to any value, and the value of the parameter is updated by learning.

In step S109, the three-dimensional data feature extraction unit 117 transmits the features extracted in step S108 and the parameter used for the feature extraction (the three-dimensional data feature extraction parameter 123) to the learning unit.

In step S110, the learning unit 114 stores the three-dimensional data features received in step 3109 and the three-dimensional data feature extraction parameter.

In step S111, the learning unit 114 performs parameter update work by using the image features and the image feature extraction parameter stored in step S106, and the three-dimensional data features and the three-dimensional data feature extraction parameter stored in step S110. For example, the stochastic gradient descent method is used to update the parameters.

The stochastic gradient descent method requires an objective function, and an objective function $E_{image}$ used for updating the image feature extraction parameter is calculated as in Formula (1) using, for example, an image feature $f_{image}$ of the same individual and a three-dimensional data feature $f_{3d}$.

[Formula 1]

$$E_{image} = \|f_{image} - f_{3d}\|_2 \qquad (1)$$

This is a squared error between the image feature $f_{image}$ and the three-dimensional data feature $f_{3d}$. The image feature extraction parameter is updated in a direction of minimizing the objective function $E_{image}$. When calculating the objective function for a plurality of individuals, for example, the $E_{image}$, can be calculated for the plurality of individuals, and a mean square error can be used, which takes the average thereof.

For example, the objective function $E_{3d}$ used for updating the parameters for three-dimensional data feature extraction uses Softmax cross-entropy by individual identification. The three-dimensional data feature extraction parameter is updated in a direction of minimizing the objective function $E_{3d}$. When calculating the objective function for a plurality of individuals, for example, the $E_{3d}$ is calculated for the plurality of individuals and an average is taken.

In step S112, the learning unit 114 transmits the updated values of the parameters calculated in step S111 to the image feature extraction unit 116 and the three-dimensional data feature extraction unit 117.

In step S113, by using the updated values of the parameters received in step S112, the image feature extraction unit 116 and the three-dimensional data feature extraction unit 117 update each of the feature extraction parameters (the image feature extraction parameter 122, and the three-dimensional data feature extraction parameter 123).

In step S114, the learning control unit 111 determines whether the learning executor continues or ends the learning, based on initial request contents and a processing result. When it is determined that the learning executor continues the learning, the process proceeds to S101, and when it is determined that the learning executor ends the learning, the process proceeds to S115.

In step S115, the learning processing is ended.

As illustrated in the present embodiment, with the learning processing, it is made possible for the three-dimensional data feature extraction unit to extract similar features for the same individual, and it is made possible for the image feature extraction unit to extract a feature close to the features output by the three-dimensional data feature extraction unit. Accordingly, the image feature extraction unit can extract, from images, features as output by the three-dimensional data feature extraction unit. This makes it possible to perform extraction of similar features in consideration of a three-dimensional structure, in the image feature extraction at the time of the search. By using these features, it is possible to improve the accuracy for searching for an object that is characteristic in shape. When performing a search using three-dimensional data, it is generally necessary to install both an RGB camera and a depth camera, or an RGB-D camera in the entire monitoring area, which increases the installation cost. However, if the present method is used, it is sufficient to prepare the three-dimensional data only at the time of the learning, and it is possible to prevent the increase in the cost of installing the cameras.

Regarding a timing of learning the image feature extraction parameter and the three-dimensional data feature extraction parameter in this flow, the parameters may be learned at the same time, or the three-dimensional data feature extraction parameter may be learned first, and then the image feature extraction parameter may be learned later.

Although a method for searching for the same individual is described in the present embodiment, this method can be used not only for searching for the same individual but also for object identification and object detection, and the accuracy can be improved.

FIG. 4 shows a flowchart of an example of the search processing used in the present embodiment.

In step S200, the search control unit 112 is activated by a search start operation of the search executor to start the search processing.

In step S201, the search executor inputs query images and gallery images required for the search processing to the image/three-dimensional data acquisition unit 113. Alternatively, the search control unit 112, at the request of the search executor, causes the image/three-dimensional data acquisition unit to acquire the query images and the gallery images necessary for the search processing from the cameras 181 and 182 installed in various places, the external monitoring image databases 171 and 172, or the like.

In step S202, the image/three-dimensional data acquisition unit 113 transmits the images received in step S201 to the search unit 115.

In step S203, the search unit 115 transmits the images received in step S202 to the image feature extraction unit 116.

In step S204, the image feature extraction unit performs the feature extraction on the images received in step S203. As the feature extraction method, the same method as used in step S104 in the learning processing flow is used. In the learning processing, when the learning is performed by using an image including color information and three-dimensional data including color information, the feature extraction can be performed on the image including color information.

In step S205, the image feature extraction unit 116 transmits features extracted in step S204 to the search unit 115.

In step S206, the search unit 115 determines a display order of search results by using the features received in step S205. When determining the display order using the features, it is necessary to calculate a similarity of the features. For the calculation of the similarity, for example, there is a method using the Euclidean distance of numerical vectors representing the features. Assuming that a feature of the query image is $f_q$ and a feature of the gallery image is $f_g$, the similarity s can be calculated as in Formula (2).

[Formula 2]

$$s = 1.0 - \frac{\|f_q - f_g\|_2}{2.0} \qquad (2)$$

The similarity takes a value from 0.0 to 1.0, and the larger the value, the higher the similarity. The display order is determined such that, for example, those having a high similarity are preferentially displayed.

In step S207, the search unit 115 transmits the images received in step S202 and the display order determined in step S206 to the display unit 140.

In step S208, the display unit displays the search results using the images and the display order received in step S207. In the display, for example, the search results are displayed from the top of a screen in a descending order of the display order.

In step S209, the search control unit 112 determines whether the search executor continues or ends the search, based on initial request contents and a processing result. When it is determined that the search executor continues the search, the process proceeds to S201, and when it is determined that the search executor ends the search, the process proceeds to S210.

In step S210, the search process is ended.

As illustrated in the present embodiment, since only the features of the images are used at the time of the search processing, the above-described camera for acquiring the three-dimensional data is not required in the monitoring area, and the increase in the installation cost of the camera can be prevented. Since the data amount in the three-dimensional data is larger than the data amount in the images, it takes more time to process the three-dimensional data. Therefore, when the feature extraction is performed by using the three-dimensional data at the time of the search processing, the search accuracy is improved, but the search speed is lowered. However, if the present method is used, features obtained from the three-dimensional data can be reproduced by processing only the images, and thus, the search accuracy can be improved without causing a decrease in the processing speed.

FIG. 5 is a diagram showing an example of an image and three-dimensional data required for the learning processing used in the present embodiment. Each item in the drawing will be described below.

500 indicates an item of baggage to be photographed.

501 indicates a camera that photographs the baggage and generates an image and three-dimensional data. As this camera, one camera capable of acquiring both an image and three-dimensional data such as an RGB-D camera may be used, or both an RGB camera and a depth camera may be used.

502 indicates an image that can be acquired when the baggage 500 is photographed by the camera 501.

503 indicates three-dimensional data that can be acquired when the baggage 500 is photographed by the camera 501. As for an expression method of the three-dimensional data, any method such as a point cloud or Voxel that can express spatial information may be used.

FIG. 6 is a table showing annotation data required for the learning processing used in the present embodiment. The format of the annotation data will be described below.

600 indicates a data table stored as the annotation data. Items of an image ID, a three-dimensional data ID, and a baggage ID are stored in the data table in association with one another. The image ID is an ID assigned to uniquely identify an image. For example, the ID is incremented by one each time an image is acquired, and then is assigned. The three-dimensional data ID is an ID assigned to uniquely identify the three-dimensional data. For example, the ID is incremented by one each time the three-dimensional data is acquired, and then is assigned. The image and the three-dimensional data are not necessarily acquired at the same time-point, but it is desirable to have a combination of the image and the three-dimensional data that are acquired at possibly closest time-points. Regarding a method of determining the combination, for example, for images and three-dimensional data of the same individual acquired at close time-points, a computer may assign a same ID for the image ID and the three-dimensional data ID at the time of the acquisition to determine the combination, or a person may later confirm the images and the three-dimensional data to determine the combination. The baggage ID is an ID for uniquely identifying the same individual, and is assigned to the acquired images and three-dimensional data by annotation work. In the data table 600, two rows from the top represent the images and the three-dimensional data of the same individual.

By performing the learning by using the annotation data as illustrated in the present embodiment, it is possible to associate the features extracted from the images with the features extracted from the three-dimensional data at the time of the learning. This method can be implemented by performing learning with the learning processing flow shown in FIG. 3 using this association.

Second Embodiment

In the present embodiment, an example in which the object search device serving as an example searches for baggage such as a suitcase will be described. The target to be searched does not have to be the baggage, and may be any object that can be imaged. In contrast to the first embodiment, the present embodiment is an example in which, as for images used in the learning processing and the search processing, by tracking an object in a camera (capturing the same object in frames continuous in chronological order in one camera), it is known in advance that the object is the same individual in a plurality of images, and as for the three-dimensional data used for the learning, the three-dimensional data is made into one piece of data in advance by a method such as three-dimensional reconstruction (by capturing an object while rotating around the object with a three-dimensional camera and obtaining data of the entire object to reconstruct three dimensions of the object). The present embodiment is the same as the first embodiment except that a plurality of images and three-dimensionally reconstructed three-dimensional data are used for each individual during the learning processing and the search processing.

FIG. 7 is a configuration diagram of an object search device 200 according to the second embodiment. The object search device 200 of the present embodiment is configured by adding a tracking unit 118, a tracking data storage unit 124, and a tracking image feature extraction parameter 125 to the object search device shown in FIG. 1 of the first embodiment.

FIG. 8 shows a functional block diagram of functional units of the object search device 200 of the second embodiment that are controlled by the learning control unit 111 or the search control unit 112. This functional block diagram is configured by adding the tracking unit 118 and the tracking data storage unit 124 to the functional block diagram shown in FIG. 2 of the first embodiment.

The tracking unit 118 performs tracking processing (of grouping together images detected to be capturing the same object and assigning the same tracking ID thereto) on a plurality of input images that are continuous in chronological order. When executing the search processing, the tracking unit 118 receives the plurality of images that are continuous in chronological order from the image/three-dimensional data acquisition unit 113, and transmits tracking data that is a tracking result and the images to the search unit 115.

The tracking data storage unit 124 stores the tracking data. When executing the tracking, the tracking data storage unit 124 receives the tracking data and the images from the tracking unit 118. When executing the search processing, the tracking data storage unit 124 transmits the tracking data and the images to the search unit 115.

FIG. 9 shows a flowchart of an example of the tracking processing used in the present embodiment.

In step S300, the tracking unit starts the tracking processing according to a tracking start instruction of a tracking executor. The tracking executor is a person or a computer that controls the tracking. In the present embodiment, the tracking executor is the learning control unit 111 or the search control unit 112 that is activated by the operation of the learning executor or the search executor.

In step S301, the tracking executor inputs the plurality of images continuous in chronological order for performing the tracking to the image/three-dimensional data acquisition unit 113.

In step S302, the image/three-dimensional data acquisition unit transmits the plurality of images continuous in chronological order that are received in step S301 to the tracking unit 118.

In step S303, the tracking unit 118 performs the tracking processing on the plurality of images continuous in chronological order that are received in step S302. For the tracking processing, for example, the following processing procedure is performed. First, a CNN detector is used to detect baggage (tracking target) in each image (the CNN detector is subjected to the learning processing in advance. Parameters used for detections by the CNN detector are stored in the tracking image feature extraction parameter 125). A detection result includes a type of the baggage and a position and a size of the baggage in an image. Next, regarding the detection results of images that are adjacent to each other in chronological order, the detection results of baggage of the same type are linked to each other as detection results spatially close to each other in distance. For the calculation of the distance, for example, the Euclidean distance of a detection position is used. From a tracking result obtained in this way, a tracking ID, which uniquely determines the same individual, and a plurality of images continuous in chronological order of the individual indicated by the tracking ID are generated as the tracking data.

In step S304, the tracking unit 118 stores the tracking data generated in step S303 in the tracking data storage unit.

In step S305, the tracking executor determines whether to continue or end the tracking.

In step S306, the tracking is ended.

By performing the tracking processing as illustrated in the present embodiment, the plurality of images can be obtained in advance for the same individual, and feature extraction can be performed by using the plurality of images at the time of the search processing.

FIG. 10 shows a flowchart of an example of the search processing used in the present embodiment. This flow is the same as the flow of the first embodiment (FIG. 4) except that the tracking processing is performed. Hereinafter, only the flow of the tracking processing will be described.

In step S401, the search executor inputs, to the image/three-dimensional data acquisition unit 113, a plurality of images continuous in chronological order showing an object as a target to be searched.

In step S402, the image/three-dimensional data acquisition unit 113 transmits the images received in step S401 to the tracking unit 118.

In step S403, the tracking unit 118 performs the tracking processing on the images received in step S402.

In step S404, the tracking unit transmits tracking data obtained as a result of the tracking processing performed in step S403 and the images to the search unit 115.

In step S405, the search unit transmits the tracking data and the images received in step S404 to the image feature extraction unit 116.

In step S406, the tracking data and the images stored in the tracking data storage unit 124 are transmitted to the image feature extraction unit 116.

In step S407, the image feature extraction unit 116 performs the feature extraction by using the tracking data and the images received in step S405 and step S406. To extract features from the plurality of images of the same individual, for example, a 3DCNN is used. In this case, the 3DCNN is also used for the image feature extraction unit in the learning flow.

In this flow, the tracking processing is performed on a plurality of items of baggage in advance, and the tracking data and the images thereof are stored in the tracking data storage unit 124. When executing the search processing, the images stored in the tracking data storage unit 124 in advance are searched as gallery images.

As illustrated in the present embodiment, by performing the tracking processing at the time of executing the search processing, a plurality of images taken from various directions for the same individual can be obtained. By using these images, which are obtained from a plurality of viewpoints, in the feature extraction, it is easy to reproduce the features obtained from the three-dimensional data, and the accuracy can be improved.

FIG. 11 is a table showing annotation data required for the learning processing used in the present embodiment. The format of the annotation data will be described below.

700 indicates a data table stored as the annotation data. An image ID, a three-dimensional data ID, a tracking ID, and a baggage ID are stored in the data table in association with one another. The image ID, the three-dimensional data ID, and the baggage ID are the same as those in the data table 600 shown in FIG. 6. As the tracking ID, an ID assigned to uniquely identify an object as the same individual and as the result of the tracking processing is used. As for the three-dimensional data, one piece of three-dimensional data is created by using, for example, three-dimensional reconstruction. Thus, one piece of three-dimensional data is associated with a plurality of images.

By performing the learning processing by using the annotation data as shown in the present embodiment, the learning processing can be performed so as to extract a characteristic of an object when the object is viewed from various directions, as a feature, and the accuracy of the search processing can be improved.

The invention is not limited to the above embodiments, and includes various modifications. For example, the embodiments described above have been described in detail for easy understanding of the invention, and the invention is not necessarily limited to those including all of the configurations described above. A part of a configuration according to a certain embodiment can be replaced with a configuration according to another embodiment, and a configuration according to a certain embodiment can be added to a configuration according to another embodiment. A part of the configuration of each embodiment may be added to, deleted from, or replaced with another configuration.

REFERENCE SIGN LIST 100 object search device
110 arithmetic unit
111 learning control unit
112 search control unit
113 image/three-dimensional data acquisition unit
114 learning unit
115 search unit
116 image feature extraction unit
117 three-dimensional data feature extraction unit
118 tracking unit
120 storage unit
121 object search program
122 image feature extraction parameter
123 three-dimensional data feature extraction parameter
124 tracking data storage unit
125 tracking image feature extraction parameter
130 input unit
140 display unit
150 communication unit
160 network
171, 172 monitoring image database
181, 182 cameras installed in various places
200 object search device of second embodiment
500 baggage to be photographed
501 camera for photographing baggage
502 image that can be acquired when baggage 500 is photographed by camera 501
503 three-dimensional data that can be acquired when baggage 500 is photographed by camera 501
600 data table stored as annotation data
700 data table stored as annotation data of second embodiment

The invention claimed is:

1. An object search device, comprising:
an image feature extraction unit that is configured with a first neural network, and is configured to input an image to extract an image feature;
a three-dimensional data feature extraction unit that is configured with a second neural network, and is configured to input three-dimensional data to extract a three-dimensional data feature;
a learning unit that is configured to extract an image feature and a three-dimensional data feature from an image and three-dimensional data of an object that are obtained from a same individual, respectively, and update an image feature extraction parameter so as to reduce a difference between the image feature and the three-dimensional data feature; and
a search unit that is configured to extract image features of a query image and a gallery image of the object by the image feature extraction unit using the updated image feature extraction parameter, and calculate a similarity between the image features of both images to search for the object.

2. The object search device according to claim 1, wherein the learning unit is configured to accept an image, three-dimensional data, and annotation data of an object that are used for learning, and identify, by using the annotation data, an association between an image and three-dimensional data that are obtained from a same individual.

3. The object search device according to claim 2, wherein the learning unit is configured to extract an image feature and a three-dimensional data feature from an image and three-dimensional data respectively that are identified, by using the annotation data, to be obtained from a same individual, and update an image feature extraction parameter and a three-dimensional data feature extraction parameter based on the extracted image feature and the three-dimensional data feature.

4. The object search device according to claim 3, wherein the image feature extraction parameter and the three-dimensional data feature extraction parameter are a weight and a bias of each neuron constituting the first or second neural network, respectively.

5. The object search device according to claim 1, wherein the search unit is configured to extract image features of a query image and a plurality of gallery images of an object, calculate a similarity between the query image and each gallery image based on the image feature of each image, and display the gallery images on a display unit in descending order of the similarity.

6. The object search device according to claim 1, wherein the learning unit is configured to extract an image feature and a three-dimensional data feature by using an image including color information and three-dimensional data including color information, respectively, and update the image feature extraction parameter, and
the search unit is configured to extract image features of a query image and a gallery image of an object including color information, and calculate a similarity between the image features of both images to perform searching.

7. The object search device according to claim 1, further comprising:
a tracking unit that is configured with a third neural network, and is configured to input a plurality of images that are continuous in chronological order, and connect objects of a same type as objects, which are spatially close to each other in distance, based on detection results of the images, so as to generate, as tracking data, a plurality of images of a same individual that are continuous in chronological order; and
a tracking data storage unit that is configured to store the tracking data generated by the tracking unit, wherein
the search unit is configured to perform object search by using the tracking data, which is obtained from the tracking unit and the tracking data storage unit, and the images.

8. The object search device according to claim 7, wherein the learning unit is configured to perform learning processing by using the tracking data, which includes the plurality of images of the same individual and is obtained from the tracking unit, and annotation data that is associated with one piece of three-dimensional data obtained by three-dimensional reconstruction.

9. An object search method, comprising:
performing learning processing of: inputting an image and three-dimensional data of an object that are obtained from a same individual, extracting an image feature from the image by a first neural network, extracting a three-dimensional data feature from the three-dimensional data by a second neural network, and updating an image feature extraction parameter so as to reduce a difference between the image feature and the three-dimensional data feature, and extracting image features of a query image and a gallery image of the object by the first neural network using the updated image feature extraction parameter, and calculating a similarity between the image features of both images to search the object.

10. The object search method according to claim 9, wherein the image feature extraction parameter is a weight and a bias of each neuron constituting the first neural network.

11. The object search method according to claim 9, wherein a plurality of images that are continuous in chronological order are input into a third neural network, and objects of a same type are connected as objects, which are spatially close to each other in distance, based on detection results of the images, so as to generate, as tracking data, a plurality of images of a same individual that are continuous in chronological order, the plurality of images, which are continuous in chronological order of the same individual and collected as the tracking data, and one piece of three-dimensional data obtained by three-dimensional reconstruction of plural pieces of three-dimensional data of the individual are input, image features are extracted by the first neural network from the plurality of images that are continuous in chronological order of the same individual and collected as the tracking data, a three-dimensional data feature is extracted by the second neural network from the one piece of three-dimensional data obtained by the three-dimensional reconstruction, and the learning processing for updating the image feature extraction parameter is performed so as to reduce a difference between the image features and the three-dimensional data feature, and the tracking data that is obtained by collecting the plurality of images continuous in chronological order of the same individual is input as the query image and gallery image of the object to search for the object.

\* \* \* \* \*